United States Patent

Wilke

[15] 3,691,858

[45] Sept. 19, 1972

[54] ELECTROMOTIVE ADJUSTING DEVICE

[72] Inventor: Richard Wilke, Schwelmerstrasse 51, 583 Schwelm, Germany

[22] Filed: Oct. 12, 1970

[21] Appl. No.: 79,812

[30] Foreign Application Priority Data

Oct. 10, 1969 Germany..........P 19 51 181.6

[52] U.S. Cl.............................74/89.15, 74/424.8 R
[51] Int. Cl.............................................F16h 27/02
[58] Field of Search..........................74/89.15, 424.8

[56] References Cited

UNITED STATES PATENTS

| 3,080,952 | 3/1963 | Carlstedt | 74/89.15 |
| 2,918,827 | 12/1959 | Brown | 74/424.8 |
| 2,882,740 | 4/1959 | Karlin | 74/424.8 |
| 3,161,074 | 12/1964 | Korthaus et al. | 74/424.8 |

Primary Examiner—W. F. O'Dea
Assistant Examiner—Wesley S. Ratliff, Jr.
Attorney—Ernest G. Montague

[57] ABSTRACT

An adjusting device, which comprises a reversible driving motor, including a spindle and a nut to constitute driving elements. An arrangement driven by said motor at least directly, whereby one of said driving elements performs a pushing and a pulling movement, respectively. A nut-housing receives the nut and connection elements, having poor friction and being non-resilient, transfer axial forces for the pushing and pulling movement, respectively, from the nut driven by either the motor or the spindle to the nut-housing. The nut-housing is rigidly connected with the driving motor and with a push-pull tube, respectively.

8 Claims, 4 Drawing Figures

PATENTED SEP 19 1972 3,691,858

Inventor
Richard Hilke
By Ernest Montague
Attorney

ELECTROMOTIVE ADJUSTING DEVICE

The present invention relates to an electromotive adjusting device, wherein a reversible motor drives a spindle-nut-arrangement directly or by means of a gear.

At devices of the type mentioned above it is known either to put the spindle into rotation, so that the nut secured against rotation performs a longitudinal movement, or to put the nut into rotation, so that the spindle secured against rotation performs the longitudinal movement.

In order to obtain high advancing speeds of these devices, it is necessary, either to drive the spindle or the nut with high speeds or to operate with high spindle pitches.

In case one operates with high spindle pitches, then the efficiency between spindle and nut increases and it is necessary to retain the spindle or the nut after performance of the longitudinal movement by means of an additional brake, in order to avoid a continuation of the operation of the spindle or the nut.

If such additional brake is to be avoided, there is the possibility to arrange the spindle pitch so small, that there exists self-braking between spindle and nut due to the friction, when the nut or the spindle are no longer driven.

As experience has shown, self-braking screw spindle gears have a sufficient long life, so that these devices can be manufactured more economically due to the omission of the necessary brakes and operate less perturbably.

In case these adjusting devices with a low spindle pitch and self-braking between spindle and nut are to reach great advancing speeds, then for that purpose a high driving speed is required.

It is easy to perceive, that this high driving speed creates a high fly wheel effect of the rotating parts. In case the pushing part runs against a firm abutment after performance of the adjustive movement, then this fly wheel effect, which is immediately stopped, leads frequently to a jamming between spindle and nut. This jamming arises from never totally avoidable tolerances, which lead to the fact that spindle and nut are set off relative to each other due to these tolerances, i.e., do not stay axially parallel. Furthermore, lateral forces acting from the outside on the pushing part can lead to a jamming. As empiric this jamming between spindle and nut is frequently so strong, that a restarting is mostly impossible.

In order to avoid this disadvantage, it is known to mount the nut or the spindle resiliently in the longitudinal direction, so that the fly wheel masses are braked down more slowly by spring forces and hence a jamming between spindle and nut is avoided. It is easily perceived that the spring path, which is necessary, to avoid a jamming, must be relatively large. If it is short only, then jamming is even favored and the loosening of the nut from the spindle is rendered more difficult, since then the spring acts similar to a spring washer between a screw and a nut.

It is further known to provide the resilient bearing in the longitudinal direction with an additional friction, so that a recoiling is avoided and at the same time a part of the fly wheel effect of the spindle-nut-arrangement is consumed by the additional friction and thus the spring path is reduced. In all cases in which, however, the fly wheel effect of the spindle-nut-arrangement is desirable as an additional stopping force this additional friction is disadvantageous.

The resilient longitudinally displaceable mounting of the nut or the spindle in the longitudinal direction is besides that expensive and requires a larger overall length of the adjusting device.

A further disadvantage of the resilient mounting in the longitudinal direction is the impaired setting accuracy.

It is, therefore, one object of the present invention to provide an electromotive adjusting device which avoids the above-mentioned disadvantages of the known structures and which is an economic device, and which also is a very simple and, therefore, reliable structure.

In accordance with the principle of the concept of the present invention, this advantage is obtained such, that the nut or the spindle are no longer mounted resiliently in the longitudinal direction.

It is another object of the present invention to provide an electromotive adjusting device, wherein the nut is seated in a housing, in which it is secured by a ball bearing in a pulling and pushing direction.

According to a further object of the present invention, the housing with the nut forms a unit, which can be manufactured structurally and separate.

It is still another object of the present invention to provide, that the nut mounted by a ball bearing can rotate in the housing, received therein about a predetermined angle, which is limited by abutments.

According to another object of the present invention, these abutments can be made resiliently. In cases, in which greater strokes can occur from the outside onto the spindle-nut-arrangement, it is provided, according to a further object of the present invention, to support the ball bearings arranged in the housing - called "nut-housing" below - on both sides of the nut by additional cup springs.

In case the longitudinal movement of the spindle-nut-arrangement of the adjusting device, according to the present invention, comes to a sudden stop at a firm abutment, then no jamming between spindle and nut can occur anymore, since the ball bearings between nut and nut-housing prevent a jamming even then, when the nut-housing is displaced in axial direction by lateral forces or tolerances caused in the manufacturing. Should a certain locking of the nut take place nevertheless in case of a very low spindle pitch and an unusually great relative displacement between spindle and nut-housing in case of a sudden braking, then the nut can rotate about a predetermined angle at the shifting of the direction of movement and loosen the jamming between spindle and nut by the started movement against the abutment of the nut-housing by the fly wheel effect produced during the speed increase of the electric motor.

As it is well known that a common three phase motor needs no complete revolution to reach its normal speed.

In this manner a locking between spindle and nut is completely prevented and the resilient mounting with all its drawbacks required therefor previously is avoided. At the same time the fly wheel effect is maintained at a sudden braking and can be used, if desired, as an additional locking force.

In order to reduce the undesirable fly wheel effect in case of a sudden braking, there are other possibilities known in the prior art, without requiring a longitudinally displaceable resiliency with addition friction and their expensive space requirement one can, by example, feed a three-phase motor with direct current at the moment of switching it off and brake the same prematurely. Also eddy current brakes are known, which limit the stopping time of the motor and limit thereby it fly wheel masses.

With these and other objects in view, which will become apparent in the following detailed description, the present invention will be clearly understood in connection with the accompanying drawings, in which the present invention is disclosed by way of example only, and in which.

Figure 1:
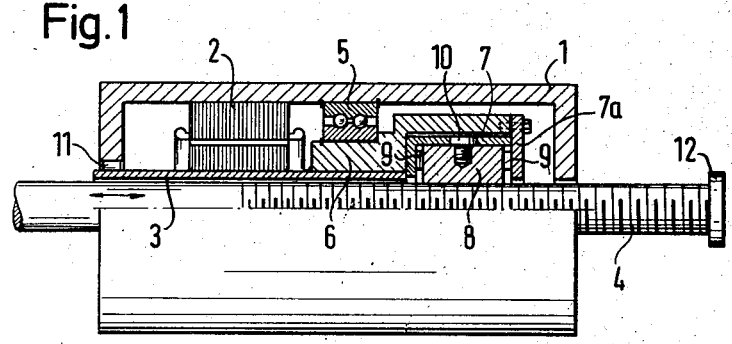
FIG. 1 is an elevation, partly in axial section, of an adjusting device, in accordance with the present invention, disclosing a first embodiment thereof.

Referring now to the drawing, and in particular to FIG. 1, the electromotive adjusting device comprises an electric motor 2 which causes rotation of a nut 8 which provides a longitudinal movement of a spindle 4 secured against rotation.

Figure 3:
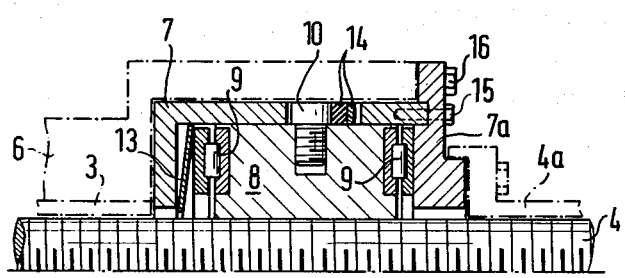
FIG. 3 is a fragmentary section of the device, shown at an enlarged scale.

In this arrangement the rotor of the electric motor 2 is mounted on a hollow rotor shaft 3, which is non-displaceably mounted in a housing 1 by means of a needle roller bearing 11 and a tension and thrust bearing 5, whereby the hollow rotor shaft 3 is welded to a rotary-symmetrically, cup-like shaped body 6. The body 6 serves the reception of a nut-housing 7 with a flange 7a as is shown in FIG. 3 in particular. In this nut-housing 7 and 7a there is disposed the nut 8, which is supported on both sides by ball bearings 9, which are shown in the embodiment as needle roller bearings.

The transmission of the rotary movement of the body 6 to the nut-housing 7 and 7a takes place by means of the flange 7a. The transmission of the rotary movement of the nut-housing 7 and 7a to the nut 8 and thereby their following takes place by means of an abutment 10 arranged in the nut 8, which is seated in a recess of the nut-housing 7 and 7a.

A collar 12 at the end of the spindle 4 forms the abutment against the housing 1 and limits the longitudinal movement of spindle 4 in the travel-out direction. The abutment in the travel-in direction is obtained by a yoke end normally required on the other end of the spindle, which runs against the housing 1 and is not shown in particular in the drawing.

Figure 2:
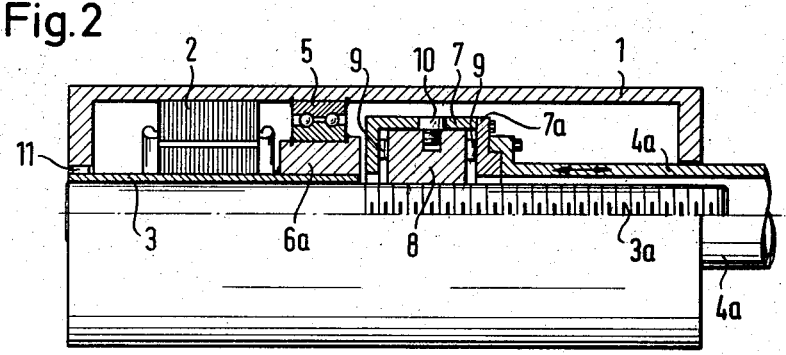
FIG. 2 is an elevation, partly in axial section, of the device corresponding with the device of FIG. 1 and disclosing a second embodiment.

Not shown either is the switch of the motor, if the spindle 4 runs against their abutments. This switching off can ensue in accordance with the status of the prior art in dependence upon the speed, by switching off the motor, because its speed drops suddenly. It is as well possible to perform the switching off by means of a sudden increase of the current of the motor. Furthermore, it is possible also to use a motor, which is designed as a standstill motor, and which does not require to be switched off, if the spindle 4 runs against the abutments. In FIG. 2 an adjusting device is shown, in which the spindle 3a, put into rotation by means of the electric motor 2, moves the nut 8 secured against rotation in axial direction. The spindle 3a is firmly connected with the hollow shaft 3 of the rotor and is axially secured together with the hollow shaft 3 by means of the needle roller bearing 11 and the thrust bearing 5. The rotationally symmetrical, cup-like shaped body 6, which receives the nut-housing 7 and 7a, in FIG. 1, comprises in FIG. 2 only the collar 6a, which is likewise welded to the hollow shaft 3 and serves to receive the thrust bearing 5. The nut-housing 7 and 7a is screwed to a push and pull tube 4a. The securing against rotation of the push and pull tube is not shown in the drawing.

The limitation of the push-pull movement ensues in this case, on one hand, by the abutment of the flange of the push tube, with the screw heads against the inner surface of the housing 1 and, on the other hand, by a yoke end (likewise not shown in the drawing) arranged at the end of the push-pull tube 4a, which runs against the outer surface of the housing 1.

FIG. 3 shows the nut-housing 7 and 7a formed by the parts 7 and 7a and the arrangement of the nut 8. The parts indicated in dotted lines on the left side of FIG. 3 belong to the embodiment of the adjusting device according to FIG. 1, and those indicated on the right side belong to the embodiment according to FIG. 2.

The rotary symmetrical, cup-like shaped nut-housing 7 and 7a receives the nut 8 and creates the flange 7a as closure which results by means of a correspondingly turned groove in centering of the body 7 with the flange 7a. On the left side of the nut 8 a cup spring 13 is provided, which enables a pre-stress of the needle roller bearing 9 and at the same time constitutes the protection of the bearing 9 against possible outer strokes onto the pushing unit. A further cup spring 13 is to be arranged on the other side of the nut 8.

It is to be pointed out in particular, that this cup spring 13 shown in FIG. 3 shall not serve as resiliency for the nut-spindle-arrangement, rather is pre-stressed such, that it can only intercept outer greater forces resiliently, than can be produced by the motor over the screw-spindle-arrangement. In cases in which this protection against outer strokes is not necessary, the design without cup springs will suffice, as shown on the right side of the nut 8.

Figure 4:
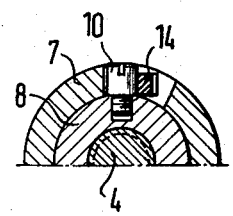
FIG. 4 is an end view of the device shown in FIG. 3.

A bolt 10 is provided with a thread and is screwed into the nut 8. On the left side it is shown, that the bolt 10 has only small axial and radial play, compare also FIG. 4. On the right side a rubber-metal compounded body 14 seated on the bolt 10 is shown, which is capable of running through a greater radial angle, prior to abutting the recess in the housing 7.

When looking at FIG. 1, it is apparent that it is not absolutely necessary to use a cup-like shaped nut-housing 7 and 7a, but it is also possible, to mount the nut 8 directly in the housing 6. The nut-housing 7 and 7a is therefore preferable, because it permits an easier exchange, also for the man not an expert, of the nut together with the ball bearing. The embodiment of flange 7a in accordance with FIG. 3 permits the use of the nut-housing formed by the body 7 and the flange 7a for both types of adjusting devices, as they are shown in FIGS. 1 and 2, whereby the securing against rotation of the adjusting device according to FIG. 2 for the push-pull tube 4a is obtained in a most simple manner, if the outer bores in the flange 7a, on which the screws 16 are no longer required, serve the purpose of establishing the securing against rotation by sliding in a known manner on bolts, which are secured in the housing 1.

Besides the adjusting devices shown in FIGS. 1 and 2 with a built-in electric motor and with pushing or pulling spindle or pushing or pulling nut, respectively, numerous other embodiments can be realized, in which by example, the rotationally symmetrical body 6 carries a clutch or coupling instead of the tube 3, to which a standard electric motor can be connected. Instead of an electric motor a hydraulic or pneumatic motor can also be used.

In a further development of the device according to the present invention, it is also possible to replace the ball bearings 9 by other elements, which are capable of transmitting axial forces likewise with low friction and at the same time prevent a friction lock between the nut and the nut-housing receiving the latter, even then, if lateral forces occur which are caused by the manufacturing tolerances or become effective from the outside onto the pushing or pulling part. Such an element could, for example, be established by a liquid ring instead of the ball bearings 9, which liquid ring is created at high speeds by the oil, which serves the lubrication between the spindle and the nut.

Besides that, it is possible, in case only small adjusting forces are required, to provide the abutment 10 with a ball bearing instead of the rubber-metal compounded body 14, to replace the ball bearings 9. The ball bearing assumes then abutment against the nut-housing 7 and 7a instead of the rubber-metal compounded body 14, without creating thereby a friction locking.

While I have disclosed several embodiments of the present invention, it is to be understood that these embodiments are given by example only and not in a limiting sense.

I claim:

1. An adjusting device comprising
a reversible driving motor,
a cooperative arrangement comprising a spindle and a nut to constitute driving elements,
said arrangement driven by said motor at least directly, whereby one of said driving elements performs a pushing and a pulling movement, respectively,
a nut-housing receiving said nut,
connection elements, having poor friction and being non-resilient, transferring axial forces for said pushing and pulling movement, respectively, from said nut driven by one of said motor and said spindle to said nut-housing, and
said nut-housing being rigidly connected with said driving motor and with a push-pull tube, respectively.

2. The adjusting device, as set forth in claim 1, wherein
said connecting elements between said nut and said nut-housing comprise a plurality of ball bearings.

3. The adjusting device, as set forth in claim 1, which includes
a bolt disposed in said nut, and transmitting a radial force, caused by the friction between said spindle and said nut, to said nut-housing, and
said nut-housing having a recess receiving said bolt, and permitting a limited rotary movement of said nut.

4. An adjusting device comprising
a reversible driving motor,
a cooperative arrangement comprising a spindle and a nut to constitute driving elements,
said arrangement driven by said motor at least directly, whereby one of said driving elements performs a pushing and a pulling movement, respectively,
a nut-housing receiving said nut,
connection elements, having poor friction and being non-resilient, transferring axial forces for said pushing and pulling movement, respectively, from said nut driven by one of said motor and said spindle to said nut-housing,
said nut-housing being rigidly connected with said driving motor and with a push-pull tube, respectively,
a bolt being disposed in said nut, and transmitting a radial force, caused by the friction between said spindle and said nut, to said nut-housing,
said nut-housing having a recess receiving said bolt, and permitting a limited rotary movement of said nut, and
said bolt having a resilient body.

5. An adjusting device comprising
a reversible driving motor,
a cooperative arrangement comprising a spindle and a nut to constitute driving elements,
said arrangement driven by said motor at least directly, whereby one of said driving elements performs a pushing and a pulling movement, respectively,
a nut-housing receiving said nut,
connection elements, having poor friction and being non-resilient, transferring axial forces for said pushing and pulling movement, respectively, from said nut driven by one of said motor and said spindle to said nut-housing,
said nut-housing being rigidly connected with said driving motor and with a push-pull tube, respectively,
said connecting elements between said nut and said nut-housing comprising a plurality of ball bearings,
a pretension cup spring being disposed on both sides between said nut-housing, receiving said nut and said ball bearings, supporting said nut, and
the pretension of said cup spring being determined such, that the forces exerted by said adjusting device cause no eventual resilient effect.

6. The adjusting device, as set forth in claim 1, wherein
said nut is structurally joined with its transmission elements in a housing, and constitutes an easily exchangeable independent structural unit.

7. The adjusting device as set forth in claim 6, wherein
said nut-housing being formed such that it selectively can be used for reciprocating movement of one of said spindle and said nut.

8. The adjusting device as set forth in claim 1, wherein
said connecting element between said nut and said nut-housing comprises a ball bearing disposed on the abutment of said nut.

* * * * *